United States Patent [19]
Yaworski et al.

[11] Patent Number: 5,280,136
[45] Date of Patent: Jan. 18, 1994

[54] METHOD AND APPARATUS FOR TERMINATING A SHIELDED HIGH VOLTAGE CABLE

[75] Inventors: Harry G. Yaworski, Easton, Pa.; Alan D. Borgstrom, Hackettstown, N.J.; Timothy R. Taylor, Easton, Pa.

[73] Assignee: Amerace Corporation, Hackettstown, N.J.

[21] Appl. No.: 760,471

[22] Filed: Sep. 16, 1991

[51] Int. Cl.$^5$ .......................................... H02G 15/064
[52] U.S. Cl. ..................................... 174/73.1; 174/80; 174/84 R
[58] Field of Search ............. 174/176, 73.1, 80, 84 R, 174/DIG. 8; 428/34.9, 35.1

[56] References Cited

U.S. PATENT DOCUMENTS

| | | | |
|---|---|---|---|
| 3,808,352 | 4/1974 | Johnson | 174/73.1 |
| 4,234,757 | 11/1980 | Simons | 174/73.1 |
| 4,319,073 | 3/1982 | Kretschmer et al. | 174/73.1 |
| 4,418,240 | 11/1983 | Chazelas | 174/73.1 |
| 4,506,430 | 3/1985 | Guzay, Jr. | 29/450 |
| 4,685,189 | 8/1987 | Palmquist et al. | 29/450 |
| 5,098,752 | 3/1992 | Chang et al. | 174/84 R X |

FOREIGN PATENT DOCUMENTS

| | | | |
|---|---|---|---|
| 0115322 | 8/1984 | European Pat. Off. | 174/73.1 |
| 2746295 | 4/1979 | Fed. Rep. of Germany | 174/73.1 |
| 2461384 | 3/1981 | France | 174/73.1 |
| 2503476 | 10/1982 | France | 174/73.1 |

*Primary Examiner*—Lincoln Donovan
*Assistant Examiner*—Hyung S. Sough
*Attorney, Agent, or Firm*—David Teschner

[57] ABSTRACT

A terminator for a shielded high voltage cable comprising a thin-walled, flexible, elongate, insulating, elastomeric housing having a bore therethrough from a substantially closed first end providing a seal to an open second end having a skirt to protect the exposed neutral conductors of jacketed concentric neutral (JCN) cable and a plurality of rain sheds formed on the outer surface thereof. The bore has specified zones of different inner diameters to provide a seal about at least a portion of the exposed cable insulation and accept cable of various diameters while minimizing the installation forces encountered when installing the terminator. Various auxiliary devices can be employed to expand the terminator bore for installation and allow cold shrink of the terminator upon removal or repositioning of such devices after installation of the terminator on the cable.

21 Claims, 7 Drawing Sheets

METHOD AND APPARATUS FOR TERMINATING A SHIELDED HIGH VOLTAGE CABLE

BACKGROUND OF THE INVENTION

1. Field of the Invention

The invention is directed to the field of terminating high voltage, shielded power cables and, more particularly, for providing a lightweight, easily installed terminator having a thin-walled, flexible elongate, insulating, elastomeric housing with a seal at one end, a skirt for preventing moisture ingress under the jacket of jacketed concentric neutral (JCN) cable at the other and an intermediate bore configuration which can accommodate a wide range of cable outer diameters while minimizing the installation forces required to install the terminator upon the cable.

2. Description of the Prior Art

Figure 1:
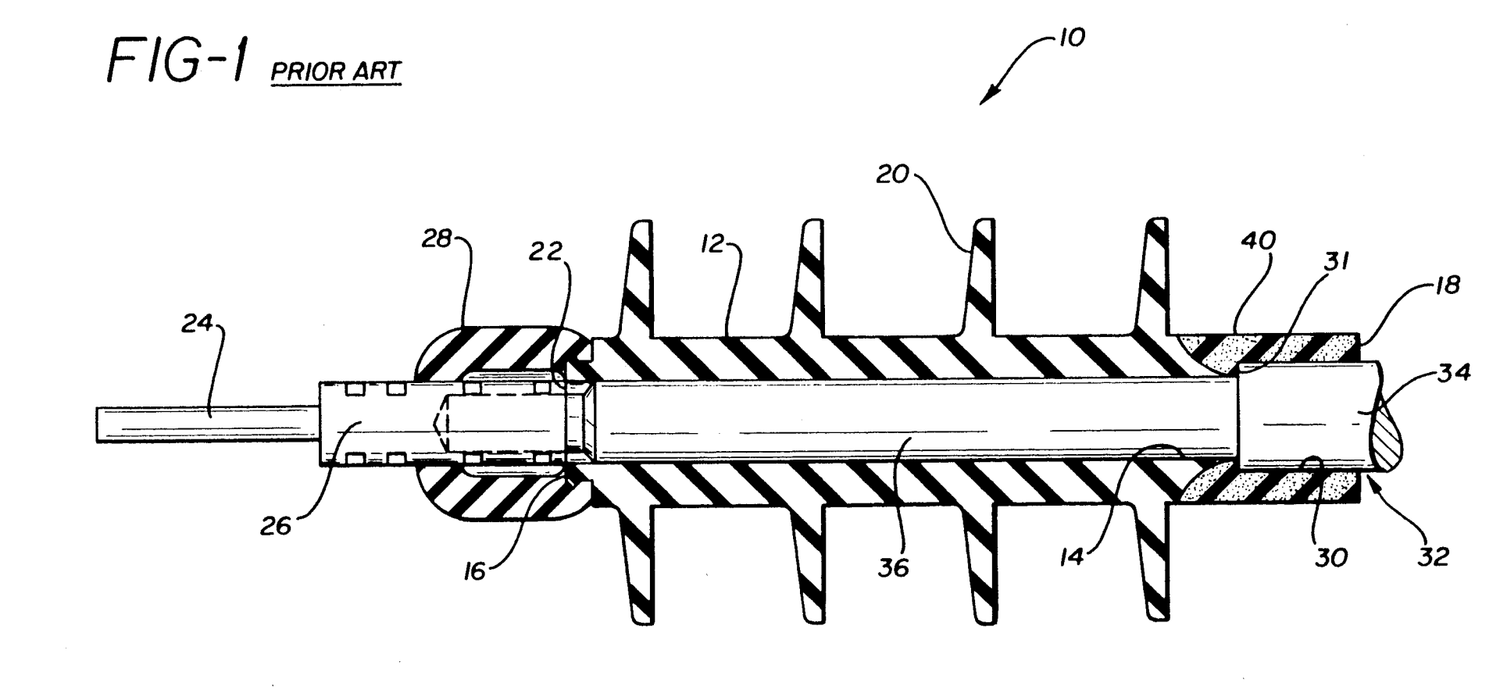
FIG. 1 is a side elevational view, partially in section, of a shielded high voltage cable terminator according to the prior art, installed upon such a cable.

Terminators 10 typically found in the prior art, as illustrated by FIG. 1 of the instant application, employ a large, rigid, heavy-walled, generally heavy, elongate, insulating, elastomeric housing 12 having a bore 14 from a first end 16 to an open end 18 and having a series of spaced-apart rain sheds 20 formed on the outer surface. An aperture 22 in first end 16 permits a crimp connector 26 to extend out of terminator 10. A seal cap 28 prevents the entry of moisture and dirt into the bore 14 along crimp connector 26.

However, such prior art devices do not seal the joint between the contact rod 24 (often made of copper) and the crimp connector 26 (often made of aluminum) which leads to failure of the joint due to galvanic action between the dissimilar metals. Joint compounds can be used to delay such destruction, but not prevent it.

Adjacent open end 18 on the interior wall of the stress relief 40 is a bore enlargement 30 which provides a stop shoulder 31 to engage the leading edge of the cable shield layer 34 of shielded high voltage cable 32. The insulation layer 36 snugly engages the walls defining the bore 14 in order to provide a void-free interface between them along at least a portion of the insulation layer 36 to reduce possible corona discharges within terminator 10. The length of cable insulation/bore wall contact and the minimum flexibility of the heavy-walled housing makes placement of the cable 32 within the bore 14 difficult.

SUMMARY OF THE INVENTION

The present invention overcomes the difficulties noted above with respect to prior art terminators by providing a terminator having a lightweight, thin-walled, elongate, insulating, elastomeric housing having a bore therein and a plurality of spaced rain sheds formed on the exterior surface thereof. A seal ring formed adjacent an opening in a first end provides an environmental seal for the contact rod passing therethrough. A skirt formed adjacent a second, open end provides a continuation of the housing which can be installed over at least a portion of the exposed concentric neutral conductors of the JCN cable to prevent water ingress under the jacket of such cable. A stress relief adjacent the open end can be placed within or outside of the skirt with suitable collection rings and external conductors to facilitate grounding of surface leakage currents.

The bore of the housing can be provided with zones of differing diameters to minimize the installation forces by reducing the length of contact between the cable and the terminator, and thus the frictional forces involved while retaining sufficient contact to provide an area of void-free interface. The shorter grip lengths also provide for an increased ability to expand and accept a wide range of cable outside diameters.

Where prestretching of the housing prior to installation of the terminator upon a cable is desired, a selectively removable mechanical expansion means is placed in a portion of the terminator bore and removed once the terminator is placed upon the cable to allow cold shrinking of the expanded terminator to its initial bore diameter gripping the cable. Alternatively, an installing fixture can be positioned within a first portion of the housing to expand same and to act as an aid to insertion of the cable further into the housing of the terminator. A second portion of the housing can be made with a thinner wall so that the bore can expand to permit the fixture to remain in such second portion while increasing the outer diameter of the second portion to provide an overall uniform outer diameter for the housing of the terminator. It is an object of this invention to provide a lightweight shielded high voltage cable terminator which is easily installed upon such cable.

It is another object of this invention to provide an integrally molded extension of the terminator housing to provide a waterseal for jacketed concentric neutral (JCN) cable.

It is an object of this invention to provide a lightweight, thin-walled terminator for high voltage shielded cable which provides an environmental seal for the contact rod at one end, a protective skirt to overlie and provide an environmental seal for the exposed concentric neutral conductors of a JCN cable at the other and a bore therebetween of zones having differing diameters to permit the bore to accommodate cables of various diameters while reducing the frictional forces encountered during installation.

It is another object of this invention to provide a lightweight, thin-walled terminator for high voltage shielded cable which includes a selectively removable mechanical expanding device to expand a portion of the terminator bore for installation upon a cable and which, upon removal, permits the cold shrink of the bore to grip the inserted cable.

It is still another object of this invention to provide a lightweight shielded high voltage cable terminator which includes an assembly device which supports and dilates the bore of the terminator and facilities the entry and positioning of such cable within the terminator.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings, in which similar elements are given similar reference characters.

DESCRIPTION OF THE PREFERRED EMBODIMENT

Turning now to FIGS. 2 to 6, there is shown a terminator 50 for terminating a shielded high voltage cable 32 constructed in accordance with the concepts of the invention. As is well known in the field, a terminator is a device placed at the end of a shielded high voltage cable to complete the shield and provide a distance between the shield, at ground potential, and the central conductor, at line potential, sufficient to prevent flashover between the two. Thus, each time a conductor of a shielded high voltage cable is to be connected, as to powered machinery, the shield must be terminated and the central conductor safely brought out.

Figure 2:
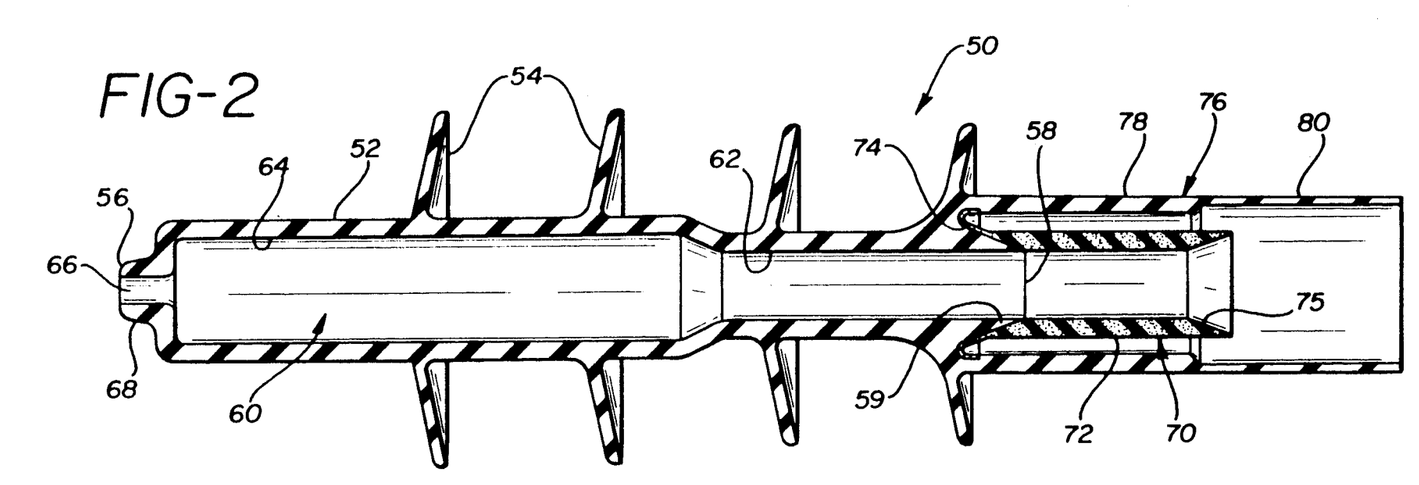
FIG. 2 is a side elevational view, in section, of a terminator for a shielded high voltage cable, constructed in accordance with the concepts of the invention.
Figure 6:
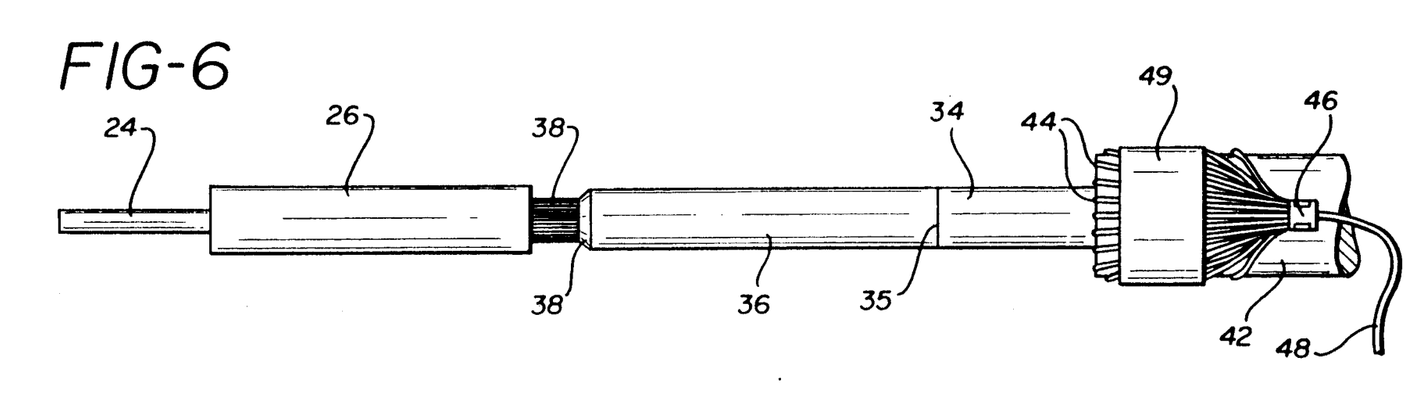
FIG. 6 is a side elevational view of a prepared JCN cable with the contact rod and crimp connector of FIG. 5 connected to the bared central conductor and the gathered and bundled concentric neutral conductors crimped to a grounding conductor.

FIG. 6 shows the preparation of a shielded high voltage cable 32 of the jacketed concentric neutral (JCN) type for insertion into the bore of a terminator such as terminator 10 of the prior art as shown in FIG. 1 or terminator 50 constructed in accordance with the concepts of the invention as shown in FIG. 2. A portion of the outer jacket 42 of the JCN cable is removed to expose the conductive shield layer 34 and the concentric neutral conductors 44 which are also braided and bundled together and joined by a crimp connector 46 to a grounding conductor 48. A mastic 49 may be applied about the concentric neutral conductors 44 to provide a moisture seal and prevent the ingress of moisture under cable 32 jacket 42. A portion of conductive shield layer 34 is removed to expose the insulation layer 36. The edge of the shield layer is square cut as at 35. The insulation layer 36 is removed to expose a length of bare conductor 38 and its edge may be square cut or pencilled as at 33.

The central conductor 38, which may be solid or stranded copper or aluminum, is introduced into the bore 27 (see FIG. 5) of the crimp barrel of crimp connector 26 and crimped to the conductor 38 using suitable crimping tools and dies as is well-know in the art. Extending from the opposite end of crimp connector 26 is a contact rod 24 for connection to, for example, machinery to be powered (not shown) or an overhead conductor (not shown). This arrangement provides a uniform size and type of contact rod 24 regardless of the conductor 38 material or gauge or whether the conductor 38 is solid or stranded.

Using the prior art terminator 10 of FIG. 1, it is now necessary to feed the cable 32 into bore 14 and along its length until crimp connector 26 exits first end 16 and extends beyond body 12 and the later applied seal cap 28. The length of the terminator body 12 will depend upon the voltage the cable 32 is to carry, being longer as the voltage increases. The diameter of the bore 14 is close to the nominal outside diameter of cable 32 so that an interference fit is achieved to minimize trapped air with its attendant corona problems. The movement of the insulation layer 36 along a rubber housing 12 produces a great deal of friction requiring a large installation force and the heavy, thick walls of the terminator housing 12 prevent the amount of stretch that would make installation easier. Further, the often eccentric outer surface of the cable 32 increases installation difficulties.

The thick-walled, heavy weight, relatively inflexible housing 12 of terminator 10 is replaced by a thin-walled, lightweight, flexible housing 52 of insulating elastomeric material such as EPDM rubber or the like (see FIG. 2) having a plurality of spaced apart rain sheds 54 along its outer surface. A bore 60 having a first predetermined diameter section 62 extends from an open second end 58 towards first end 56. Communicating with bore section 62 is a second bore section 64 of a second, larger, predetermined diameter. The bore section 64 diameter is large enough to accept the barrel of crimp connector 26 and permits its free movement therein, thus eliminating frictional forces that could otherwise develop. The relatively shorter gripping length of bore section 62 permits gripping the cable insulation layer 36 to provide a void-free interface to eliminate corona discharge problems while minimizing the frictional forces developed between the cable insulation layer 36 and the housing 52 during installation of the terminator 50 on cable 32. Also, the length of housing 52 along bore section 62 permits its expansion to accommodate a wide range of cable diameters.

Figure 4:
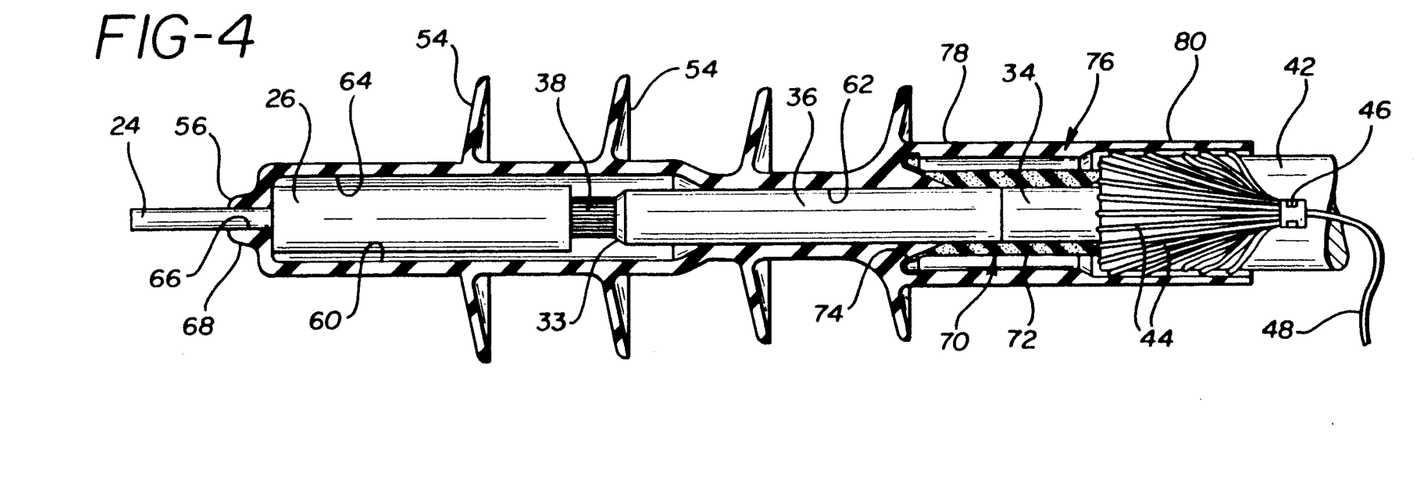
FIG. 4 is a side elevational view, partially in section, of the terminator of FIG. 2 installed upon a JCN high voltage cable.
Figure 5:
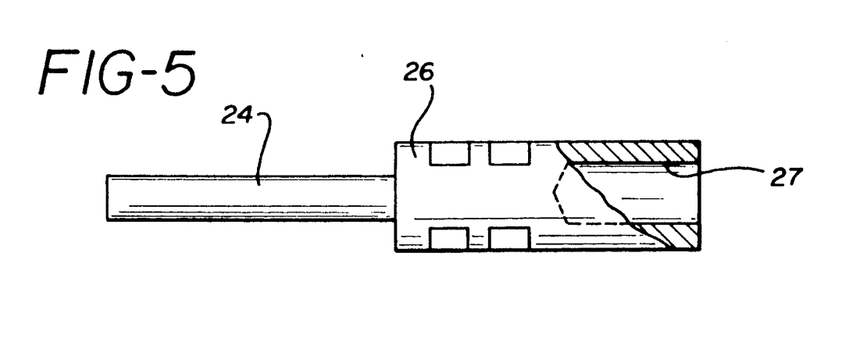
FIG. 5 is a side elevational view of the contact rod and crimp connector, partially in section.

First end 56 has an aperture 66 therein surrounded by an annular ring 68 to provide an environmental seal about contact rod 24 which will extend therethrough as shown in FIG. 4, thus removing the requirement to provide separate add-on sealing means for the terminator housing as is true of the prior art device of FIG. 1 (see seal cap 28).

Formed at open second end 58 of housing 52 is a stress relief 70 consisting of a generally cylindrical tube 72 of semi-conductive elastomeric material and an outwardly tapered stress cone 74 also of semi-conductive elastomeric material. Tube 72 and cone 74 may be formed integrally and bonded to housing 52 second end 58 or molded integrally with housing 52. The second end 58 may be conically shaped as at 59 to match with and support stress cone 74. The entry to tube 72 is tapered as at 75 for ease of insertion of cable 32.

Figure 3:
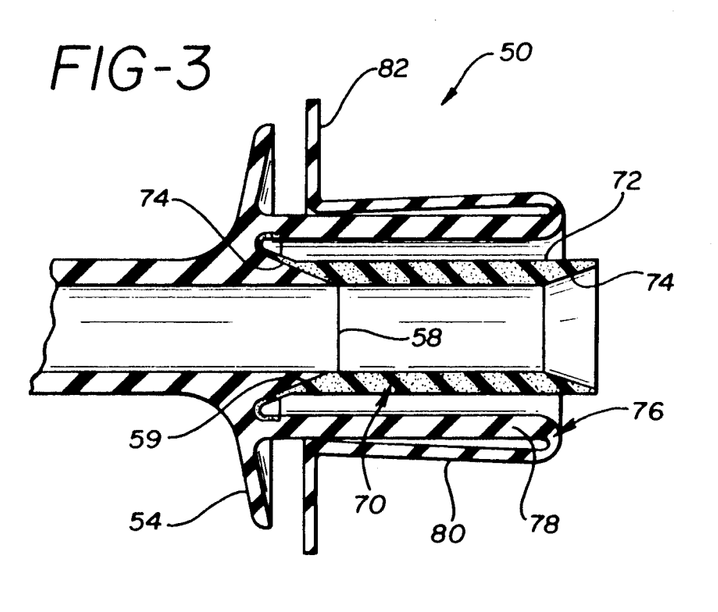
FIG. 3 is a side elevational view, in section, of the skirt of the terminator of FIG. 2 in its folded position with added integrally molded pull tabs.
Figure 3A:
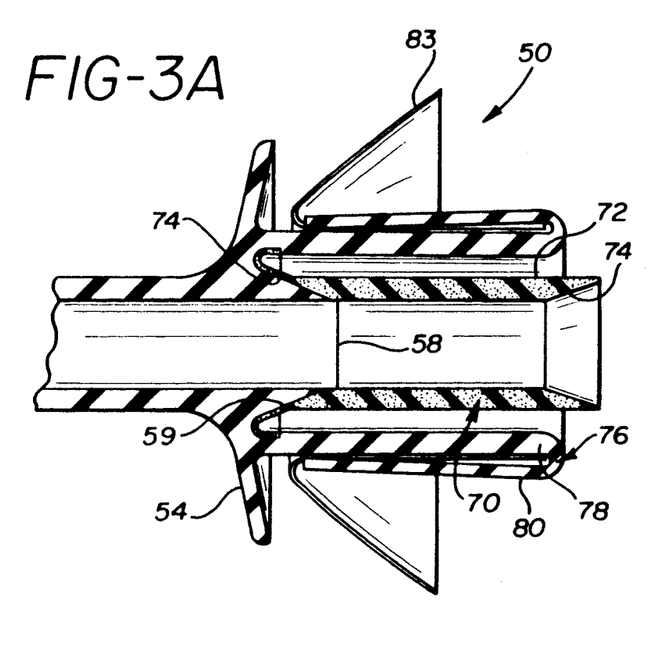
FIG. 3A is a side elevational view, in section, of the skirt of the terminator of FIG. 2 in its folded position with a pull tape installed.

A skirt 76 of insulating elastomeric material extends from the rain shed 54 closest to open end 58 over the stress cone 74 and conductive tube 72 and beyond the free end of stress relief 70. The skirt 76 is spaced from tube 72 by an air space sufficient to receive the cable 32 with concentric neutral wires 44 exposed and folded back on jacket 42 as shown in FIG. 4. Skirt 76 has a first section 78 of a first predetermined thickness and a second section 80 of a lesser, second predetermined thickness which facilitates the folding of section 80 back over section 78 as is shown in FIG. 3. This permits the insertion of high voltage cable 32 without interference from skirt 76. A pull tab 82 as is shown in FIG. 3 may be integrally molded onto section 80 to assist in displacing section 80 from the position shown in FIG. 3 to that shown in FIG. 4 or a pull tape 83 as shown in FIG. 3A may be used or the section 80 can be simply unrolled.

To use the terminator 50 of FIGS. 2 to 6, the cable 32 is prepared as shown in FIG. 6 removing the various layers of jacket 42, shield 34 and insulation 36. The concentric neutral conductors 44 are folded back and crimped with a ground conductor 48 by crimp connector 46 and crimp connector 26 is crimped to bared conductor 38. The skirt 76 of terminator 50 is folded back so that section 80 overlies section 78 as shown in FIG. 3. The crimp connector 26 and then the cable insulation layer 36 cause bore section 62 to dilate to permit passage of crimp connector 26 and cable insulation layer 36 therethrough. Once the cable 32 is finally positioned, the bore section 62 will relax to grip the insulation layer 36 of the inserted cable 32. Far less frictional forces are generated in instilling terminator 50 with the shorter bore section 62 than would be generated if bore 60 contacted cable 32 along its entire length.

Insertion of cable 32 continues until the shoulder of crimp connector 26 abuts the interior wall of end 56. As the contact rod 24 reaches aperture 66 in end 56 it dilates it and passes through allowing the aperture to relax and grip contact rod 24. The ring 68 about aperture 66 insures a relatively long contact surface with contact rod 24, and thus a good environmental seal against dirt, dust, moisture and other contaminants.

The crimp connector 26 seats in bore section 64 which is of sufficient diameter to minimize any contact with crimp connector 26.

When jacket 42 butts against the free end of tube 72 as shown in FIG. 4, the skirt 76 is unfolded by pulling tab 82 or merely unrolling section 80 from over section 78. The skirt 76 provides an environmental seal for the exposed concentric neutral wires 44.

Figure 9:
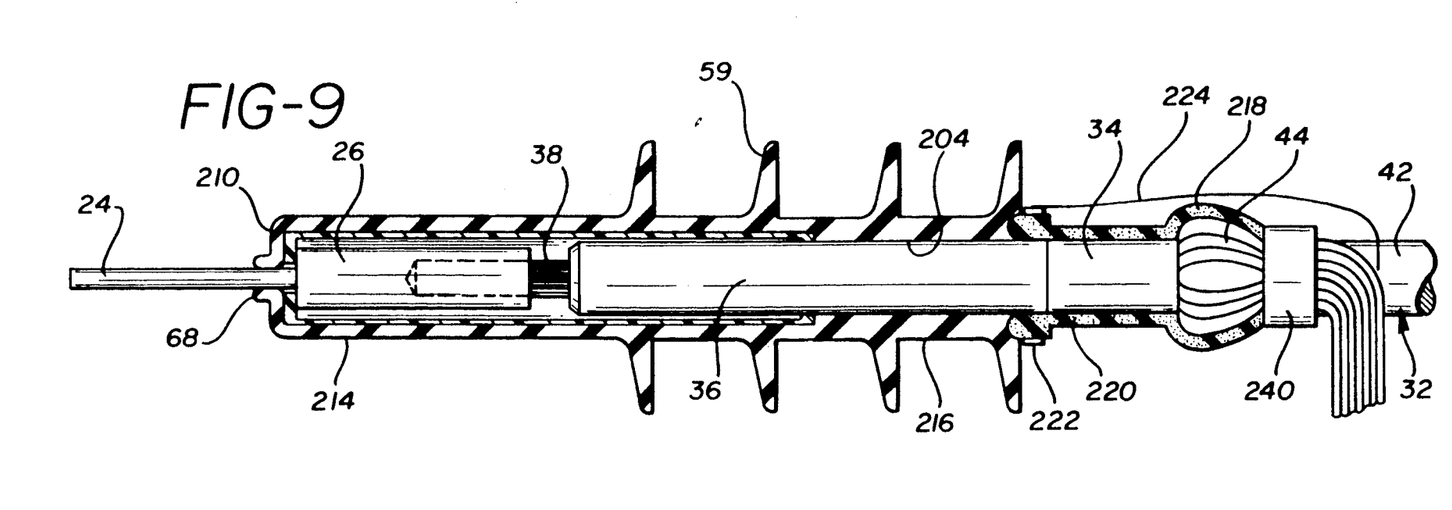
FIG. 9 is a side elevational view, partially in section, of the terminator of FIG. 7 installed upon a JCN high voltage cable.

Since skirt 76 encompasses the entire stress relief 70 and provides a continuous path for surface leakage currents to the concentric neutral conductors 44 no external collection ring or auxiliary conductor is required. A collection ring is not required to protect the joint between the housing 52 and the stress cone 74 or tube 72 because the internal leakage currents are far lower than those generated on the outer surface where surface contaminants serve to increase the magnitude of the leakage currents. Thus, where the juncture between the insulation of the housing meets the semi-conductive stress relief on the outside surface as is shown in FIG. 9, it is necessary to add a metal collection ring 222 and an auxiliary conductor 224 to provide a path for the greater magnitude leakage currents. The semi-conductive stress relief layer and shield have too high an impedance to adequately carry off leakage currents present.

Figure 11:
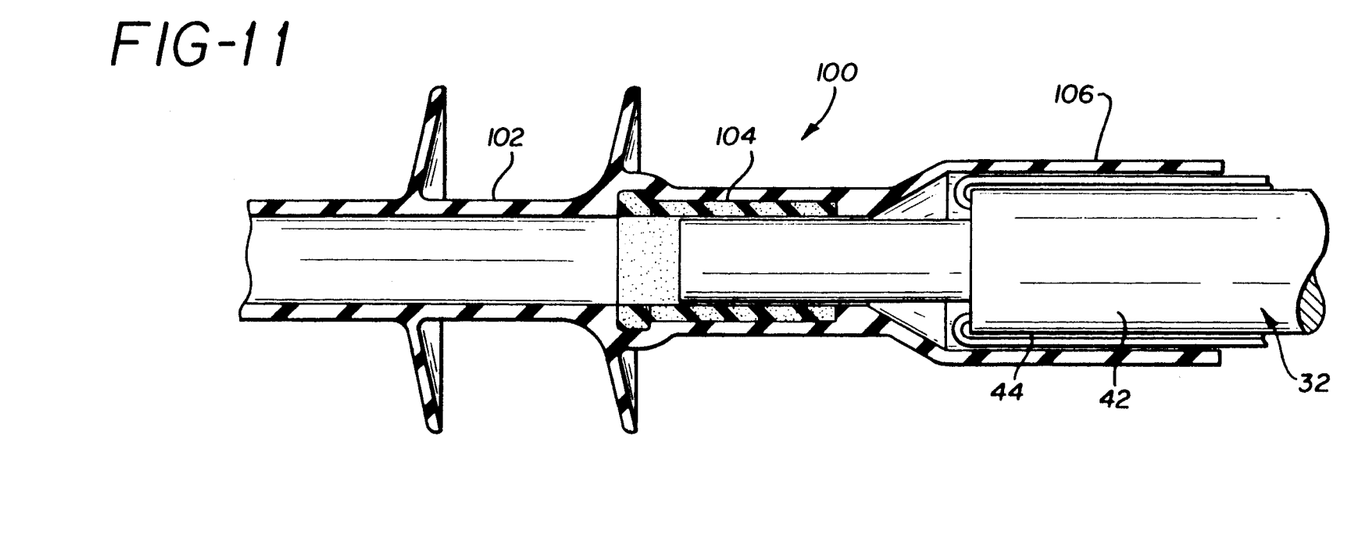
FIG. 11 is a side elevational view, partially in section, showing a further embodiment of a terminator constructed in accordance with the concepts of the invention.
Figure 12:
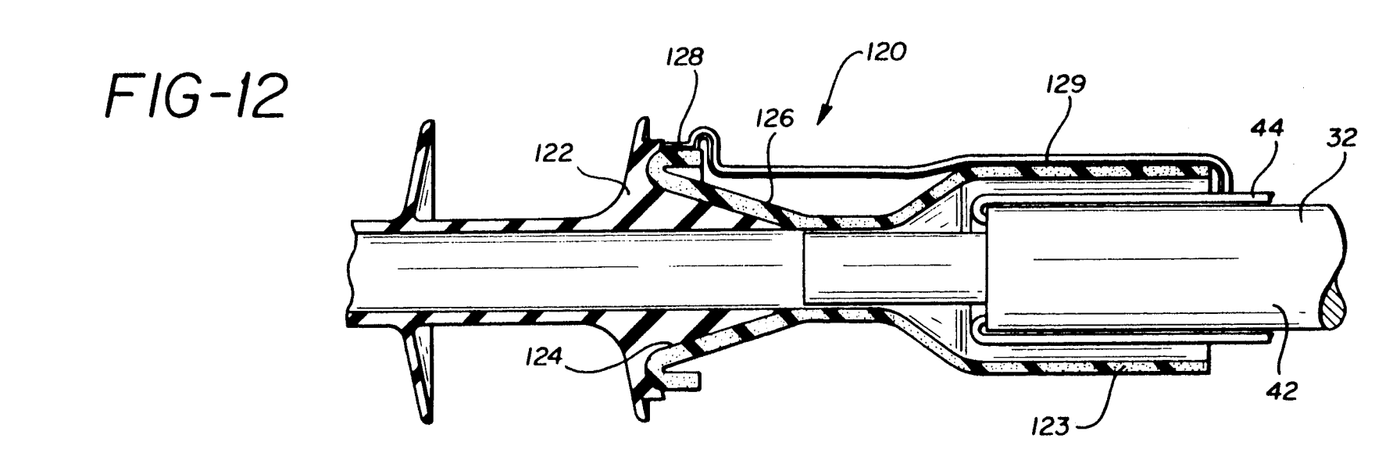
FIG. 12 is a side elevational view, partially in section, of yet another embodiment of a terminator constructed in accordance with the concepts of the invention.

FIG. 11 shows an alternative form of terminator 100 where the stress relief 104 is formed inside of the housing 102 and thus does not require a collection ring and auxiliary conductor. The terminators 120 of FIG. 12 and 130 of FIG. 13 employ stress cones 126 and 136, respectively, which are on the outside of the housings 122 and 132, respectively. Each stress cone 126 and 136, respectively, requires a collection ring 128 and 138 and an auxiliary conductor 129 and 140, respectively. In the terminator of FIG. 12, the housing 122 is formed conically at its end face and the stress cone is placed upon such housing end portion.

Figure 13:
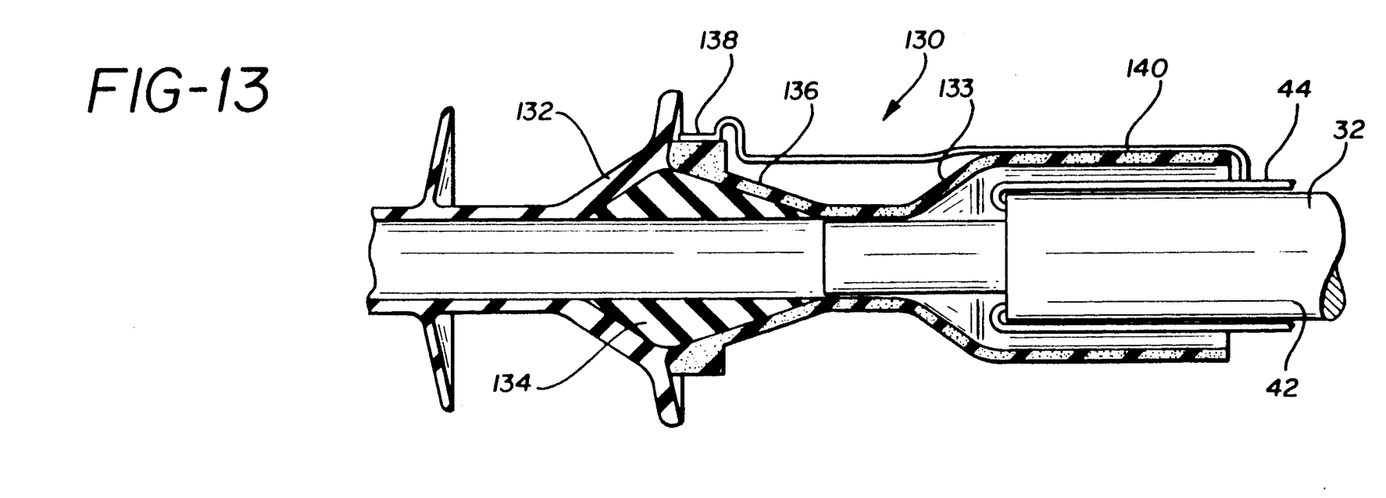
FIG. 13 is a side elevational view, partially in section, of another embodiment of a terminator constructed in accordance with the concepts of the invention.

FIG. 13 adds the insulating double cone structure 134 as a separate part and places stress cone 136 upon the rear conical section of part 134. In each of the terminators 100 of FIG. 11, 120 of FIG. 12 and 130 of FIG. 13, a skirt 106, 123 and 133, respectively, provides protection for the exposed concentric neutral wires 44 of JCN cable 32.

Figure 10:
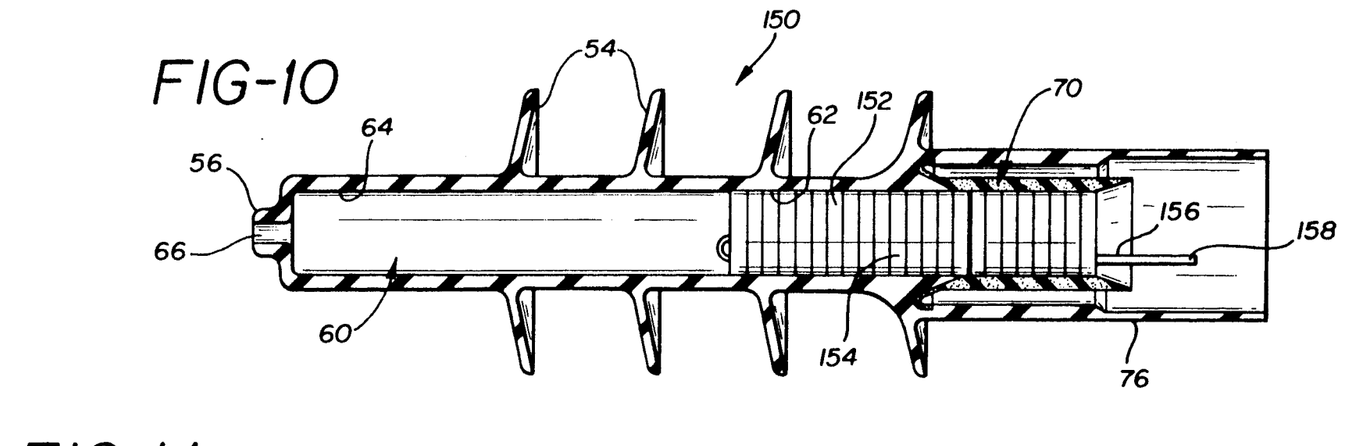
FIG. 10 is a side elevational view, partially in section, of yet another terminator constructed in accordance with the concepts of the invention with a selectively removable expansion means in the bore of said terminator to selectively expand a section thereof.

At times, it is desirable to expand bore section 62 prior to installation of terminator 150 upon JCN cable 32 rather than cause the expansion as the terminator 50 and cable 32 are assembled. This can be done, for example, by the use of a mechanical expansion device of the type shown in U.S. Pat. No. 3,515,798 issued Jun. 2, 1970. The bore section 62 is expanded by a suitable mandrel (not shown) and placed over a unitary tubular shell 152 which is helically grooved along its entire length, the continuous groove 154 permitting the shell to be unravelled and pulled out as a continuous strip 156 when free end 158 is withdrawn along the longitudinal axis of terminator 150. The removal of tubular shell 152 permits the terminator 150 to cold shrink and return bore section 62 to its initial relaxed size gripping the cable insulation layer 34 as shown in FIG. 4.

Figure 7:
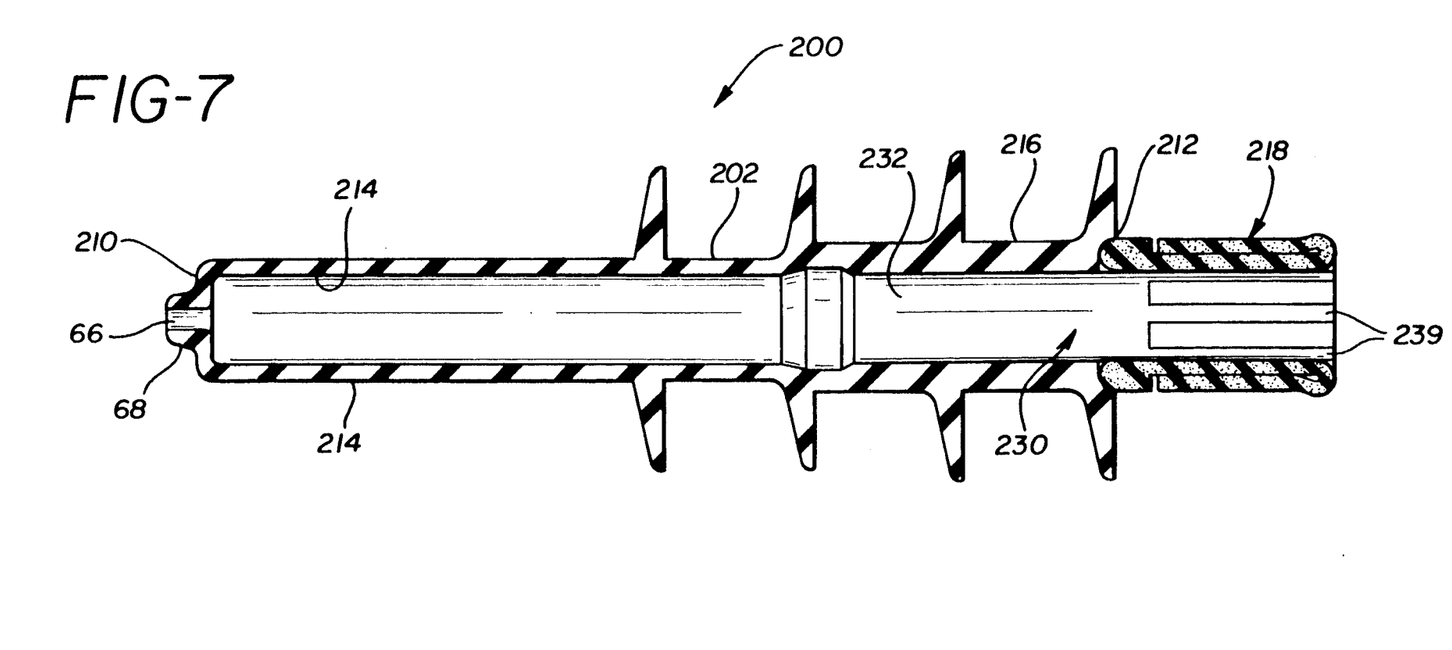
FIG. 7 is a side elevational view, partially in section, of a further embodiment of a terminator constructed in accordance with the concepts of the invention.

Another technique for expanding a portion of the terminator bore employs an assembly device which is shifted within the bore of the terminator housing and remains permanently as a part of the housing. Terminator 200, see FIGS. 7 to 9, has a housing 202 made of insulating elastomeric material with a uniform diameter bore 204 from a first substantially closed end 210 to a second open end 212. A first section 214 of the housing 202 has a predetermined wall thickness and a predetermined exterior diameter. Second section 216 has a predetermined wall thickness greater than that of section 214 and an overall predetermined exterior diameter also greater than that of section 214.

Figure 8:
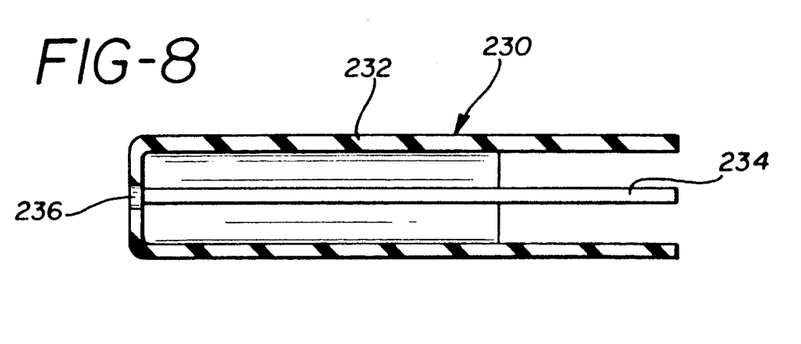
FIG. 8 is a side elevational view, in section, of the assembly device of FIG. 7 showing the details thereof.

An assembly device 230 in the form of a tube 232 with extending rails 234, as shown in FIG. 8, is placed in bore 204 in housing section 216 adjacent the skirt 218 which extends from second end 212. In this position, housing section 216 is held in its expanded condition and the cable 32 prepared as shown in FIG. 6 is inserted into assembly device 230 with contact rod 24 extending through aperture 236 in tube 232. The cable 32 is then forced upwardly towards substantially closed end 210 with assembly device 230 acting as a guide and expanding housing section 214 as it is advanced. This permits housing section 216 to cold shrink and grasp the insulation layer 36 of cable 32. In its final position, assembly device 230 expands housing section 214 until its exterior diameter matches that of housing section 216 and tube 232 is trapped within the expanded bore 204 within housing section 214 as is shown in FIG. 9. The skirt 218 is now unfolded as was skirt 76 of FIG. 4 and a band 240 applied to unite the concentric neutral conductors 44. Since the stress relief 220 is on the outside and joins the insulating housing on the outside surface of terminator 200, a collection ring 222 is employed and an auxiliary conductor 224 is used to connect it to the concentric neutral conductors 44 as set out above.

Accordingly, there has been shown and described a thin-walled, flexible, elongate terminator fabricated from an insulating elastomeric material which provides at one end an environmental seal for a contact rod and at the other an environmental seal for the exposed concentric neutral conductors of a JCN cable from which a portion of the jacket has been removed. The length of contact between the terminator bore and cable insulation layer is reduced to decrease the frictional forces encountered during assembly while retaining a void-free interface between the cable insulation and terminator housing.

The effective portion of the terminator bore can be expanded during assembly by the very cable to which the terminator is installed or pre-expanded by a removable expansion device or expanded by an assembly tool which remains as part of the assembled terminator and cable.

While there have been shown and described and pointed out the fundamental novel features of the invention as applied to the preferred embodiments, it will be understood that various omissions and substitutions and changes of form and details of the device illustrated and in its operation may be made by those skilled in the art without departing from the spirit of the invention.

The embodiments of the invention in which an exclusive property or privilege is claimed are defined as follows:

1. A terminator for jacketed concentric neutral (JCN) shielded high voltage cable which has been prepared by removing a portion of the jacket and conductive cable shield adjacent one end thereof to expose a cable portion having the cable insulation exposed, a cable portion having the conductive shield of the cable exposed and a cable portion having the conductive shield and overlying concentric neutral conductors exposed comprising:
   a. a thin-walled, flexible, elongate insulating elastomeric housing having a plurality of rain sheds about the outer periphery of said housing;
   b. a first bore in said housing extending from a first substantially closed end to a second open end; said substantially closed first end providing an aperture extending through said first end;
   c. said first bore having zones of differing inside diameter to permit the walls of said terminator housing defining said first bore to grip the cable insulation of the prepared JCN shielded high voltage cables of differing cable jacket outside diameters inserted into said terminator housing while minimizing the installation forces required to install the terminator upon the cable;
   d. a thin-walled, flexible, elongate, conductive elastomeric stress relief portion having a first end and a second end, said first end of said stress relief portion being coupled to said second open end of said housing,
   e. a second bore in said stress relief portion extending from said portion second end to said portion first end and in communication with said first bore in said housing;
   f. said second bore having an inside diameter to permit the walls of said stress relief portion to grip the cable insulation and conductive cable shield beyond the exposed concentric neutral conductors of the prepared JCN shielded high voltage cable inserted within said stress relief portion bore;
   g. and a thin-walled, flexible, cylindrical, elongate skirt having a first open end and a second free open end, said skirt first open end coupled to said housing adjacent said housing second open end; said skirt having an interior diameter greater than the external diameter of said stress relief portion to provide a continuous space between the external surface of said stress relief portion and the inner surface of said skirt for substantially the entire length of said stress relief portion to permit at least a portion of said skirt to overlie the concentric neutral conductors of the prepared JCN shielded high voltage cable inserted into said terminator.

2. A terminator as defined in claim 1, wherein said skirt is initially folded back upon itself away from said second end of said stress relief portion to prevent engagement of said skirt with a cable until after said terminator is installed upon a cable.

3. A terminator as defined in claim 1, wherein said skirt is integral with said terminator housing and formed as a tube concentric with and extending beyond said second end of said stress relief portion.

4. A terminator as defined in claim 3, wherein said skirt is so constructed and arranged so as to be in intimate contact with the concentric neutral conductors of a prepared JCN shielded high voltage cable introduced into said terminator to provide a direct conductive path for the leakage currents on the surface of the terminator to the concentric neutral conductors of the cable introduced into said terminator.

5. A terminator as defined in claim 3, wherein said skirt forms a barrier to the ingress of moisture into a prepared JCN shielded high voltage cable introduced into said terminator under the cable jacket of cable.

6. A terminator as defined in claim 5, further including a mastic between said skirt and the concentric neutral conductors of a prepared JCN shielded high voltage cable introduced into said terminator to improve the barrier to moisture ingress into the cable under the cable jacket thereof.

7. A terminator as defined in claim 3, wherein said second free open end of said skirt is initially folded back upon itself to prevent engagement of said skirt with a prepared JCN shielded high voltage cable introduced into said terminator until after said terminator is installed upon the cable and the skirt unfolded over the cable.

8. A terminator as defined in claim 7, further comprising an integrally molded pull tape between said skirt and said folded back second free open end of said skirt to assist in the unfolding of said second free open end of said skirt from the remainder of said skirt.

9. A terminator as defined in claim 7, further comprising an integrally molded pull tab coupled to said second free open end of said skirt to assist in the unfolding of said second free open end of said skirt from the remainder of said skirt.

10. A terminator as defined in claim 7 wherein said skirt has a first portion of a first predetermined inner diameter and a second portion of a second predetermined diameter greater than said first predetermined diameter to establish a fold line at the junction of said first and second portions to permit said second portion to be folded over said first portion.

11. A terminator as defined in claim 10, wherein only said second portion of said skirt is positioned over the exposed concentric neutral conductors of a prepared JCN shielded high voltage cable introduced into said terminator.

12. A terminator as defined in claim 1, wherein said first substantially closed end aperture is defined by said flexible, elastomeric housing; said aperture being caused to dilate to permit the passage therethrough of a contact rod attached to a prepared JCN shielded high voltage cable introduced into said terminator and gripping the contact rod to form an environmental seal thereabout.

13. A terminator as defined in claim 12, further comprising an annular ring about said aperture in said first substantially closed end, said ring interior diameter being caused to dilate as the contact rod attached to a prepared JCN shielded high voltage cable introduced into said terminator is passed therethrough and allowed to relax to grip the contact rod to thereby increase the length of the seal along contact rod.

14. A terminator as defined in claim 13, wherein said annular ring is integral with said first substantially closed end.

15. A terminator as defined in claim 1, wherein said first bore has a first zone of a first inner diameter large enough to permit the unimpeded movement therethrough of a crimp barrel of a contact rod attached to a prepared JCN shielded high voltage cable and the exposed insulation layer of the high voltage cable introduced into said terminator and a second zone of a second inner diameter smaller than said first inner diameter to grip the exposed insulation layer of the high voltage cable inserted into said terminator with a void-free interface.

16. A terminator as defined in claim 15, wherein said first substantially closed end aperture is defined by said flexible, elastomeric housing; said aperture being caused to dilate to permit the passage therethrough of a contact rod attached to a prepared JCN shielded high voltage cable introduced into said terminator and gripping the contact rod to form an environmental seal thereabout.

17. A terminator as defined in claim 15, wherein said skirt is initially folded back upon itself away from said second end of said stress relief portion to prevent engagement of said skirt with a cable until after said terminator is installed upon a cable.

18. A terminator as defined in claim 16, wherein said skirt is initially folded back upon said terminator housing away from said second, open end to prevent engagement of said skirt with a cable until after said terminator is installed upon a cable.

19. A terminator as defined in claim 1, wherein said stress relief portion is comprised of a tubular portion and an outwardly tapered stress cone portion adjacent said first end of said stress relief portion.

20. A terminator as defined in claim 19, wherein said stress relief portion tubular portion and said tapered stress cone portion and said housing are integral.

21. The method of installing a terminator upon a jacketed concentric neutral (JCN) shielded high voltage cable has been prepared by removing a portion of the jacket and conductive cable shield adjacent one end thereof to expose a cable portion having the cable insulation exposed, a cable portion having the conductive shield of the cable exposed and a cable portion having the conductive shield and overlying concentric neutral conductors exposed, the terminator having a thin-walled, flexible, elongate, insulating, elastomeric housing with a plurality of rain sheds on the outer surface and a first bore in said housing from a first substantially closed and having a dilatable aperture therethrough to a second, open end, said first bore having at least one zone of decreased inner diameter, a thin-walled, flexible, elongate, conductive elastomeric stress relief portion having a second bore from a first end of said stress relief portion which first end is coupled to said second, open end of said housing to a second open end of said stress relief portion, said second bore being in communication with said first bore and a thin-walled, flexible, cylindrical, elongate skirt having a first open end and a second free open end, said skirt first open end coupled to said housing adjacent said housing second open end; said skirt having an interior diameter greater than the external diameter of said stress relief portion to provide a continuous space between the external surface of said stress relief portion and the inner surface of said skirt portion for substantially the entire length of said stress relief portion to permit at least a portion of said skirt to overlie the concentric neutral conductors of a prepared JCN shielded high voltage cable inserted into said terminator; the free open end of said skirt being initially folded back upon itself comprising the steps of:
   a. removing a portion of the exposed cable insulation from the end of the prepared JNC shielded high voltage cable to expose the metallic central conductor;
   b. placing a crimp barrel at one end of a connector having an extending contact rod at the other end over the exposed metallic central conductor of the cable;
   c. crimping said crimp barrel to said exposed metallic central conductor so as to have said contact rod extend beyond said cable end;
   d. expanding said zone of decreased inner diameter of said first bore by insertion of said cable insulation therein;
   e. expanding said aperture to accept said contact rod therein and forming a seal therewith; and
   f. unfolding said skirt from its original position to overlie at least a portion of the exposed concentric neutral conductors.

* * * * *